US010724592B2

(12) United States Patent
Torstveit

(10) Patent No.: US 10,724,592 B2
(45) Date of Patent: Jul. 28, 2020

(54) HIGH FRICTION INSULATOR

(71) Applicant: Consolidated Metco, Inc., Vancouver, WA (US)

(72) Inventor: Sven Torstveit, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 197 days.

(21) Appl. No.: 15/492,710

(22) Filed: Apr. 20, 2017

(65) Prior Publication Data

US 2018/0306261 A1    Oct. 25, 2018

(51) Int. Cl.
*F16D 65/84* (2006.01)
*F16D 65/12* (2006.01)
*B60B 27/00* (2006.01)
*F16D 65/02* (2006.01)
*F16D 65/78* (2006.01)

(52) U.S. Cl.
CPC ............. *F16D 65/84* (2013.01); *F16D 65/12* (2013.01); *F16D 65/123* (2013.01); *B60B 27/0052* (2013.01); *F16D 2065/1384* (2013.01); *F16D 2065/1396* (2013.01); *F16D 2065/785* (2013.01); *F16D 2200/006* (2013.01); *F16D 2200/0047* (2013.01)

(58) Field of Classification Search
CPC ....... F16D 2065/785; F16D 2065/1384; F16D 2065/1396; F16D 2200/0047; F16D 2200/0006
See application file for complete search history.

(56) References Cited

U.S. PATENT DOCUMENTS

| 2,616,230 | A |   | 11/1952 | Hough |
| 3,655,210 | A |   | 4/1972 | Farnam |
| 3,837,657 | A |   | 9/1974 | Farnam |
| 3,863,936 | A | * | 2/1975 | Farnam .................. F16J 15/123 277/592 |
| 4,421,197 | A |   | 12/1983 | Chandioux |
| 4,564,242 | A | * | 1/1986 | Krude ................. B60B 27/0005 188/264 A |
| 4,796,728 | A | * | 1/1989 | Kanengieter ........... F16D 55/38 188/18 A |

(Continued)

FOREIGN PATENT DOCUMENTS

| CN | 1793037 A | 6/2006 |
| CN | 101155991 B | 4/2008 |

(Continued)

OTHER PUBLICATIONS

Extended European Search Report from related European Patent Application No. 18168574.4 dated Oct. 18, 2018, 7 pages.

(Continued)

*Primary Examiner* — Bradley T King
(74) *Attorney, Agent, or Firm* — Fitch, Even, Tabin & Flannery LLP

(57) ABSTRACT

A gasket is provided comprising a composite insulating component and a bonding resin. The insulating component is a ceramic abrasive and the bonding resin is a phenolic thermoset resin. The composite insulating component is selected from the group of alumina, zirconia, or silicon carbide. The gasket further comprises a reinforcing fiber selected from the group of glass, ceramic, aramid, or PAN fibers.

15 Claims, 2 Drawing Sheets

(56) References Cited

U.S. PATENT DOCUMENTS

| | | | |
|---|---|---|---|
| 4,911,972 A | 3/1990 | Mercuri | |
| 4,961,991 A * | 10/1990 | Howard | B32B 5/08 428/114 |
| 5,407,032 A * | 4/1995 | Gaudefroy | B61H 5/00 188/218 XL |
| 6,098,764 A * | 8/2000 | Wirth | F16D 65/123 188/218 XL |
| 7,223,464 B2 * | 5/2007 | Hanzawa | C04B 35/573 188/251 R |
| 7,261,846 B2 * | 8/2007 | Bauer | C04B 35/522 264/136 |
| 7,780,243 B2 * | 8/2010 | Lippis | F16D 65/12 188/18 A |
| 9,469,048 B2 * | 10/2016 | Ungerank | C08G 73/1042 |
| 9,776,241 B2 * | 10/2017 | Huang | B22D 19/0081 |
| 2006/0175160 A1 * | 8/2006 | Weiss | F16D 65/12 188/218 XL |
| 2007/0187907 A1 * | 8/2007 | Potier | B32B 15/20 277/654 |
| 2009/0298993 A1 * | 12/2009 | Kosinski | C08K 3/346 524/446 |
| 2011/0024244 A1 * | 2/2011 | Roehling | F16D 65/092 188/234 |
| 2011/0278802 A1 * | 11/2011 | Nitsche | B62D 25/088 277/650 |
| 2012/0263935 A1 * | 10/2012 | Ledford | D02G 3/16 428/293.4 |
| 2013/0171391 A1 * | 7/2013 | Tilford | C08G 73/1042 428/36.4 |
| 2013/0260150 A1 * | 10/2013 | Grivei | H01B 1/24 428/402 |
| 2016/0222908 A1 * | 8/2016 | Martin | F16J 15/0825 |
| 2016/0289126 A1 * | 10/2016 | Kitami | F16D 69/026 |
| 2018/0230901 A1 * | 8/2018 | Tominaga | F02B 77/11 |

FOREIGN PATENT DOCUMENTS

| | | |
|---|---|---|
| CN | 101524990 A | 9/2009 |
| CN | 203147163 U | 8/2013 |
| CN | 204383080 U | 6/2015 |
| JP | 2008013131 A | 1/2008 |

OTHER PUBLICATIONS

Canadian Office Action from related Canadian Patent Application No. 3,002,054 dated Mar. 14, 2019; 3 pages.

Canadian Office Action from related Canadian Patent Application No. 3,002,054 dated Jun. 14, 2019; 3 pages.

Norton 10" 46 Grit Aluminum Oxide Cutoff Wheel product item from https://www.mscdirect.com/product/details/01351006; publicly available before Apr. 20, 2017; 2 pages.

Camel Grinding Wheels 9" 36 Grit Zironia Alumina Cutoff Wheel product item from https://www.mscdirect.com/product/details/59536029; publicly available before Apr. 20, 2017; 2 pages.

Grainger website of Abrasive Cut-Off and Chop Wheels products from https://www.grainger.com/category/abrasives/cut-off-and-grinding-wheels/abrasive-cut-off-and-chop-wheels; publicly available before Apr. 20, 2017; 10 pages.

Discovery Channel's "How It's Made: Grinding Wheels", Season 2, Episode 18, premiered Sep. 20, 2005; transcribed from https://www.youtube.com/watch?v=ggMi0Ym6fnM; 15 pages.

Chinese Office Action from related Chinese Patent Application No. 201810359175.X dated May 8, 2020 with English translation; 15 pages.

* cited by examiner

HIGH FRICTION INSULATOR

BACKGROUND OF THE INVENTION

Disc brake rotors, for example, disc brake rotors used in heavy trucks, are typically comprised of cast steel or cast iron. Such disc brake rotors are mounted adjacent wheel hubs which can be comprised of cast aluminum or of an aluminum alloy. During operation of the disc brake, the rotor can become quite hot from friction contact with the brake pads. It is desirable to keep such heat at the brake rotor from flowing back into the aluminum wheel hub, which in turn can lead to damage of the hub.

In order for a material to function successfully as a heat insulating gasket between the disc brake rotor and the aluminum wheel hub, the gasket must sufficiently inhibit heat feed-back from the disc brake rotor to the wheel hub. A resistance to degradation at high temperatures is also important, due to the high temperatures of the disc brake rotor during braking.

An object of the invention is, therefore, to provide a gasket that can be used between a disc brake rotor and a wheel hub in a heavy truck.

SUMMARY OF THE INVENTION

An embodiment of gasket in accordance with an embodiment of the present invention is a ceramic abrasive material and a binding matrix. The ceramic abrasive material may be selected from the group of alumina, zirconia, silicon carbide or equivalent materials. Such abrasive materials typically have a Mohs hardness greater than 6.

The binding matrix typically is comprised of phenolic thermoset resins such as a phenol-formaldehyde resin. A reinforcing fiber such as aramid, glass, ceramic or PAN may also be included in the resin.

The gasket is designed for use between the disc brake rotor and the wheel hub of a heavy truck or other type of vehicle. The gaskets have strength suitable for handling and have resistance to high temperatures, while providing thermal insulation between the disc brake rotor and the wheel hub, thus preventing damage of the aluminum hubs due to the flow back of heat.

The gasket should be of a thickness so as to provide sufficient thermal insulation. In the preferred application in heavy trucks, a thickness between about 0.06 and about 0.12 inches is suitable.

The gaskets may be formed by any suitable means known in the art for manufacturing composite materials such as molding, water jet cutting, or laser burning.

DETAILED DESCRIPTION OF THE INVENTION

Figure 1:
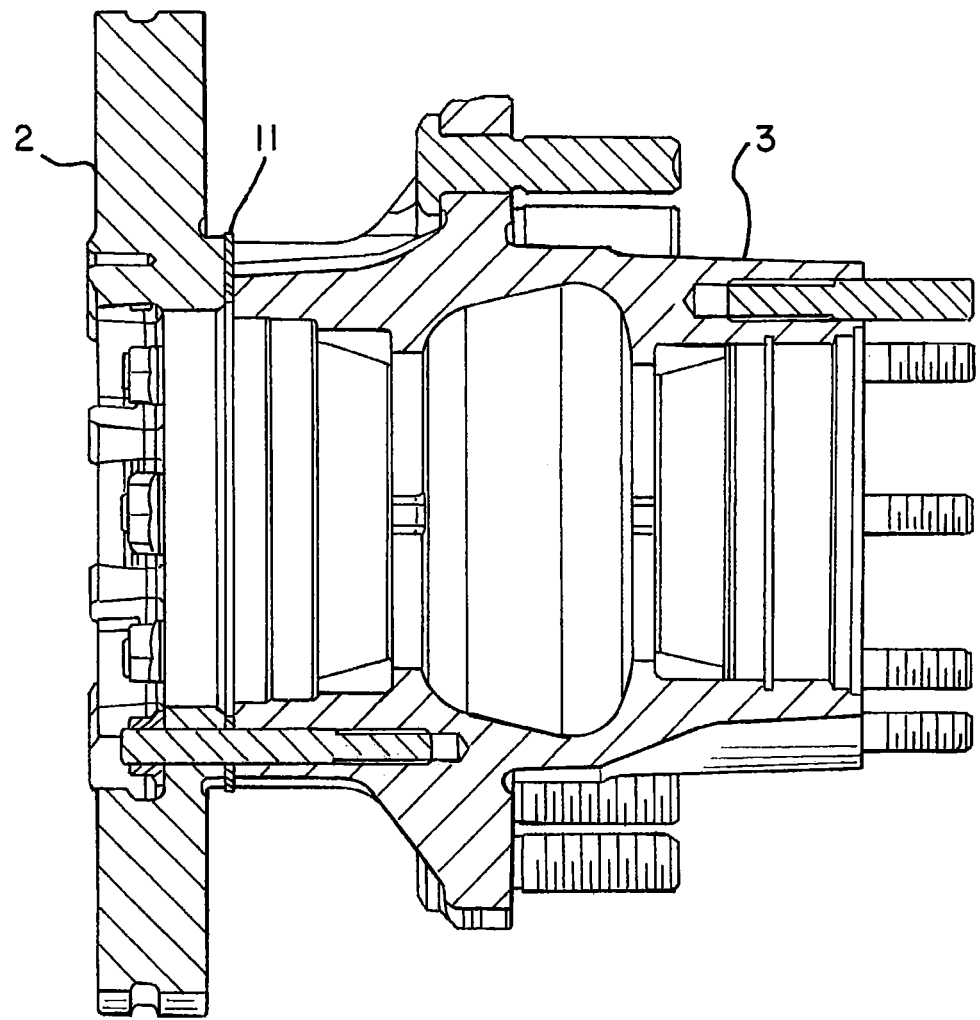
FIG. 1 is a side view in partial cross section of a gasket in accordance with an embodiment of the present invention in a disc brake—wheel hub assembly.
Figure 2:
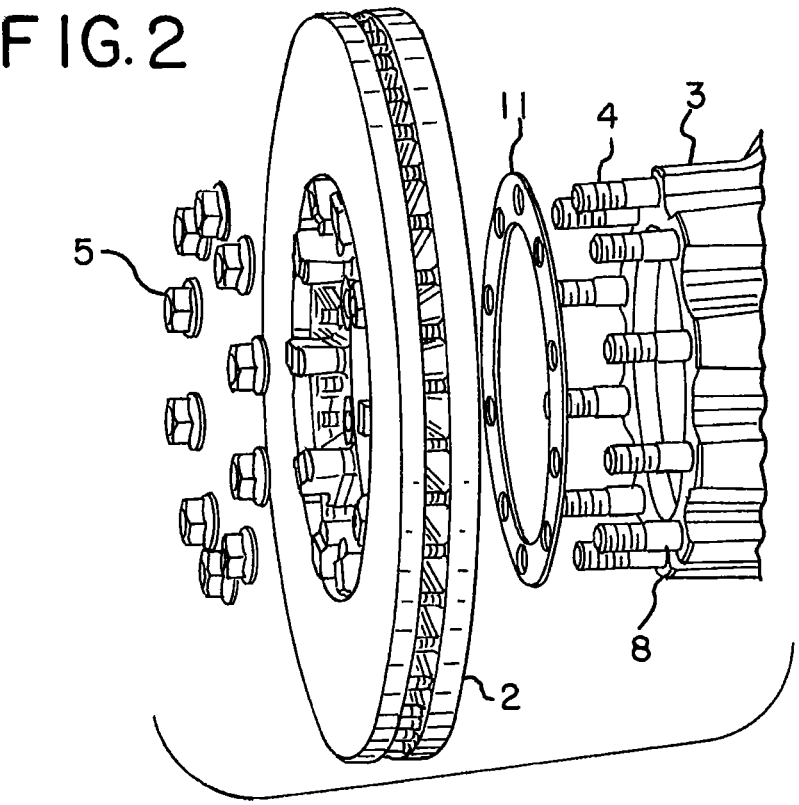
FIG. 2 is a partial view of a gasket in accordance with a first embodiment of the present invention in a disc brake—wheel hub assembly.
Figure 3:
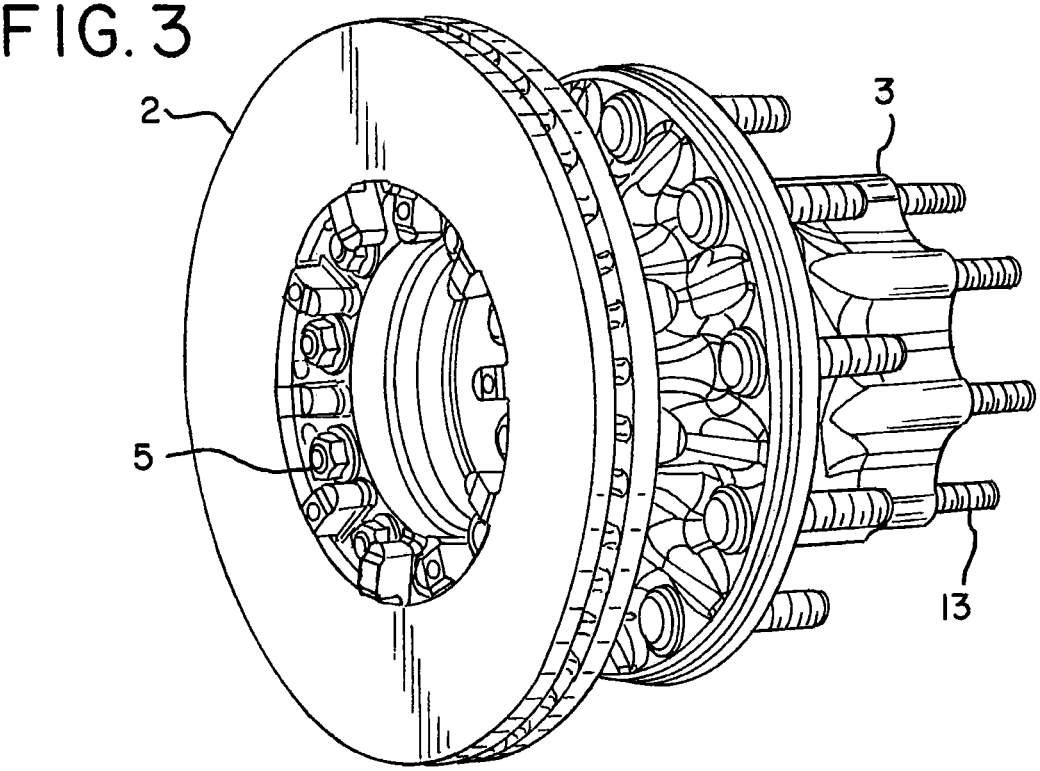
FIG. 3 is a perspective view of gasket in accordance with an embodiment of the present invention in a disc brake—wheel hub assembly.

Referring now to FIGS. 1-3, a disc brake rotor 2 is shown attached to a wheel hub 3.

Disc brake rotor 2 is typically comprised of cast steel or cast iron, and wheel hub 3 is typically a cast aluminum component. Rotor studs 4 extend axially from wheel hub 3 through openings in disc brake rotor 2 and are held by rotor stud nuts 5.

Wheel studs 13 extend axially from wheel hub 3 in a direction opposite from that of rotor studs 4. Wheel studs 13 are used to mount a wheel and tire assembly onto wheel hub 3.

Gasket 11 is positioned between disc brake rotor 2 and an end 8 of wheel hub 3. Gasket 11 has openings through which rotor studs 4 pass. Accordingly gasket 11 is held axially between disc brake rotor 2 and wheel hub end 8. Rotor stud nuts 5 when tightened for service assure that disc brake rotor 2 is held against wheel hub end 8 with only gasket 11 therebetween. A typical thickness of gasket 11 is from 0.06 to 0.12 inch. Gasket 11 is chosen from a composition of a ceramic abrasive such as alumina, zirconia, silicon carbide or equivalent with a bonding resin from the family of phenolic thermoset resins. A reinforcing fiber such as glass, ceramic, aramid, or PAN may also be present. The thermal conductivity of the gasket 11 should be up to 4 W/mK.

The minimum compressive strength of gasket 11 should be 144 MPa at a temperature of 425 degrees C. The dimensional stability of gasket 11 should be such that residual fastener torque is retained at a minimum of 50% of starting torque following three cycles from 20 degrees C. to 425 degrees C. to 20 degrees C.

Further, the gasket 11 should have a minimum static coefficient of friction of 0.5 with cast iron and 0.7 with aluminum.

What is claimed is:

1. A gasket for being positioned between a disc brake and a wheel hub, the gasket comprising:
   a front surface for being positioned against one of the disc brake and the wheel hub;
   a rear surface for being positioned against the other of the disc brake and the wheel hub;
   a plurality of through openings for receiving rotor studs, the through openings extending from the front surface to the rear surface;
   wherein the gasket has a thickness measured between the front and rear surfaces in the range of 0.06 inches to 0.12 inches;
   ceramic abrasive particles in a binding matrix,
   wherein the binding matrix includes a phenolic thermoset resin;
   a reinforcing fiber in the binding matrix, the reinforcing fiber selected from the group of glass, ceramic, aramid, or PAN fibers;
   wherein the minimum compressive strength of the gasket is 144 MPa at a temperature of 425 degrees C.,
   wherein the front and rear surfaces include the ceramic abrasive particles to frictionally engage the disc brake and the wheel hub and resist relative movement of the disc brake, gasket, and wheel hub.

2. The gasket of claim 1
   wherein the ceramic abrasive particles are selected from the group of alumina, zirconia, or silicon carbide.

3. The gasket of claim 1
   wherein the thermal conductivity of the gasket is up to 4 W/mK.

4. The gasket of claim 1
   wherein the part dimensional stability of the gasket is such that a residual fastener torque is retained at a minimum of 50% of starting torque following three cycles from 20 degrees C. to 425 degrees C. to 20 degrees C.

5. The gasket of claim 1 wherein the gasket has a minimum static coefficient of friction of 0.5 with cast iron and 0.7 with aluminum.

6. A gasket comprising:
a front surface for being positioned against one of a disc brake and a wheel hub;
a rear surface for being positioned against the other of the disc brake and the wheel hub;
a central through opening;
a plurality of through openings radially outward from the central through opening;
a ceramic abrasive material in a binding matrix,
wherein the binding matrix includes a phenolic thermoset resin,
a reinforcing fiber in the binding matrix, the reinforcing fiber selected from the group of glass, ceramic, aramid, or PAN fibers,
wherein the ceramic abrasive material includes zirconia,
wherein the front and rear surfaces include the zirconia to frictionally engage the disc brake and wheel hub and resist relative movement of the disc brake, wheel hub, and gasket.

7. The gasket of claim 6 wherein the thermal conductivity of the gasket is up to 4 W/mK.

8. The gasket of claim 6 wherein the minimum compressive strength of the gasket is 144 MPa at a temperature of 425 degrees C.

9. The gasket of claim 6 wherein the part dimensional stability of the gasket is such that a residual fastener torque is retained at a minimum of 50% of starting torque following three cycles from 20 degrees C. to 425 degrees C. to 20 degrees C.

10. The gasket of claim 6 wherein the gasket has a minimum static coefficient of friction of 0.5 with cast iron and 0.7 with aluminum.

11. A disc brake-wheel hub assembly comprising
a disc brake rotor,
a wheel hub having an end with rotor studs protruding axially therefrom in a first direction,
wheel studs protruding axially in a second direction opposite the first direction;
a gasket comprised of ceramic abrasive particles in a binding matrix,
wherein the binding matrix includes a phenolic thermoset resin,
wherein the gasket includes a front surface contacting the disc brake rotor and a rear surface contacting the wheel hub end;
wherein the gasket includes a plurality of openings, with one of the rotor studs passing through each gasket opening,
such that the gasket is held between the disc brake rotor and the wheel hub end,
wherein the gasket includes a reinforcing fiber in the phenolic thermoset resin selected from the group of glass, ceramic, aramid, or PAN fibers,
wherein the front and rear surfaces include the ceramic abrasive particles configured to frictionally engage the disc brake and wheel hub end and resist relative rotary movement of the disc brake, wheel hub end, and gasket.

12. The disc brake-wheel hub assembly of claim 11 wherein the ceramic abrasive particles are selected from the group of alumina, zirconia, or silicon carbide.

13. The disc brake-wheel hub assembly of claim 11 wherein the thermal conductivity of the gasket is up to 4 W/mK.

14. The disc brake-wheel hub assembly of claim 11 wherein the part dimensional stability of the gasket is such that a residual fastener torque is retained at a minimum of 50% of starting torque following three cycles from 20 degrees C. to 425 degrees C. to 20 degrees C.

15. The disc brake-wheel hub assembly of claim 11 wherein the gasket has a minimum static coefficient of friction of 0.5 with cast iron and 0.7 with aluminum.

\* \* \* \* \*